Figure 1:
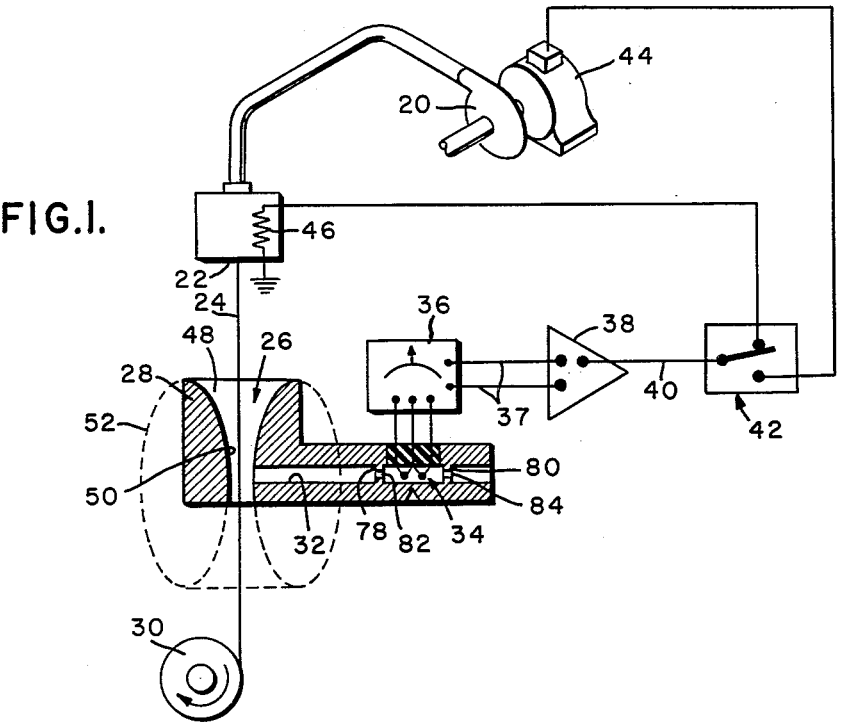

Nov. 3, 1964    R. HORNE    3,154,810
DENIER MONITORING AND CONTROL SYSTEM
Filed Dec. 31, 1962

INVENTOR.
RONALD HORNE

BY *Kelly O Corley*
ATTORNEY

United States Patent Office 3,154,810
Patented Nov. 3, 1964

3,154,810
DENIER MONITORING AND CONTROL SYSTEM
Ronald Horne, Pensacola, Fla., assignor to Monsanto Company, a corporation of Delaware
Filed Dec. 31, 1962, Ser. No. 248,512
7 Claims. (Cl. 18—8)

The present invention concerns a system and apparatus for continually measuring and controlling the denier of strand-like materials, such as textile filaments, wires and the like. More particularly, the present invention concerns such monitoring apparatus wherein the strand is passed through a suitably shaped orifice to generate an air current, which is then transduced to an electrical signal related to the denier of the strand.

Denier monitoring has usually been achieved in the past by manual methods, such as stripping off a given length of the strand and weighing to determine the denier. This method has several obvious drawbacks. The portion of the strand thus checked was necessarily a minute fraction of the entire strand, thus rendering this method unsuited for accurate and continuous control. Short variations could not be detected, and the manual method was necessarily expensive since it involved manual labor.

Denier monitoring by other than manual methods has been attempted by capacitive measurements, pneumatic-hydrostatic measurements, and electro-pneumatic measurements. The capacitive method was elaborate and expensive, involving fairly complex and sometimes erratic electronic equipment. Such apparatus was usually difficult to calibrate and the small signals obtained normally required amplification to be useful, which further added to the complexity of the system. The pneumatic-hydrostatic methods provided low sensitivity and were slow in their response to varying deniers. In addition, since the variation in denier was indicated by the height of a water column, some sort of transducer had to be supplied to convert this indication into a usable signal for control purposes.

Electro-pneumatic denier monitoring has thus far been unsuccessful due to lack of sensitivity and slowness of response. Such prior electro-pneumatic apparatus was unduly complicated and contained a large number of components which had to be accurately matched to one another.

Accordingly, it is an object of the present invention to provide electro-pneumatic denier monitoring equipment which is greatly simplified as compared to the prior art.

A further object is to provide apparatus of the above character which has greatly increased sensitivity and reliability.

A further object is to provide apparatus of the above character which is adapted for rapid threading of the strand to be measured through the monitoring apparatus.

Other objects of the invention will in part be obvious and will in part appear hereinafter.

The invention accordingly comprises the features of construction, combinations of elements, and arrangement of parts which will be exemplified in the constructions hereinafter set forth, and the scope of the invention will be indicated in the claims.

Figure 2:
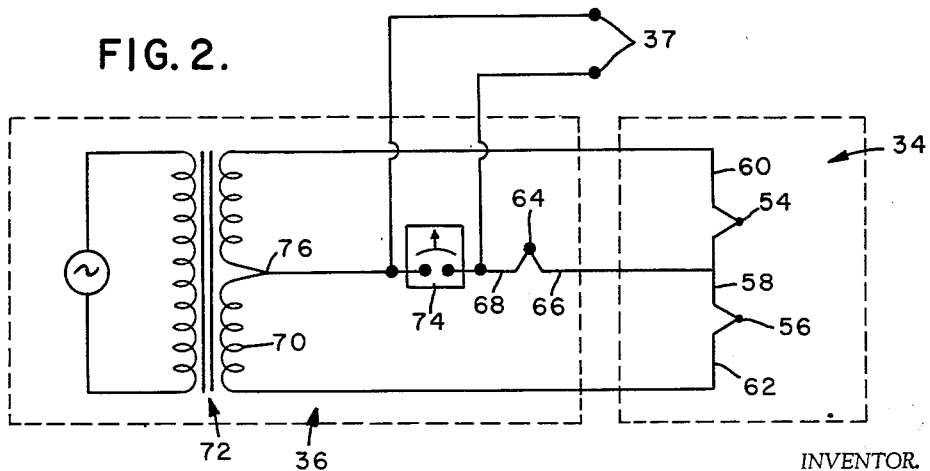

For a more complete understanding of the nature and objects of the invention, reference should be had to the following detailed description taken in connection with the accompanying drawing, in which:

FIGURE 1 is a schematic view, partly in section, of a textile strand spinning system incorporating a denier monitoring mechanism according to the present invention;

And FIGURE 2 is a schematic circuit diagram of an exemplary circuit for use in the FIGURE 1 system.

Referring now to the drawings, the denier monitoring apparatus according to the present invention is illustrated as controlling a thermo-plastic filament spinning process. As shown in FIGURE 1, a suitable thermo-plastic polymer is extruded by pump 20 through a heated spinneret 22 to form a strand 24, which, after solidification, is passed through orifice 26 in monitoring block 28 to conventional further apparatus such as take-up device 30. A transverse passage 32 in block 28 has one end communicating with the atmosphere and the other end communicating with a narrow portion of orifice 26, and houses a thermopile 34 near orifice 26. As will be more clearly explained, variations in denier of strand 24 cause corresponding variations in air currents in passage 32 and a variable cooling of thermopile 34. This produces an output signal which is fed to control and monitoring circuit 36 where it may be displayed or recorded as desired. Preferably, the output signal is also supplied on conductor 37 to amplifier 38 and used to control the denier of strand 24. Thus the amplified output signal on conductor 40 may be fed to a control system 42, schematically illustrated as a switch, and used to control the speed of pump motor 44 or to control the operation of spinneret heater 46. It will be understood by those skilled in the art that control system 42 preferably includes mechanism to operate motor 44 at a constant rate if denier control is achieved by varying the operation of heater 46, and conversely would preferably include mechanism to operate heater 46 at a constant rate if denier control is achieved by varying the speed of motor 44.

Referring more particularly to FIGURE 1, it has been found that when orifice 26 is suitably shaped and proportioned, a separate source of pressurized air or vacuum is not required. Threadline 24 moving through orifice 26 may be made to generate the necessary air currents to vary the output of thermopile 34 in accordance with variations in denier of strand 24. Thus, as illustrated in FIGURE 1, the cross section of orifice 26 continually and smoothly decreases from the wide entrance end 48 thereof to the narrow restricted portion 50 thereof. When the contour of orifice 26 between points 48 and 50 corresponds to a segment of an internal quadrant of an elliptical toroid 52 (indicated in dotted lines), the efficiency of the pumping action of strand 24 is especially high. As illustrated, the segment may include an entire quadrant of toroid 52 although a part of the quadrant nearest end 48 may be eliminated. Preferably the degree of ellipticity of the ellipse defining toroid 52 should be relatively high for optimum operation.

Although the cross-sectional area of orifice 26 preferably decreases according to some inverse exponential or non-linear function of distance from portion 50 to entrance end 48, the orifice is operative at reduced efficiency if the cross-sectional area of orifice 26 decreases at a linear rate, i.e., if orifice 26 has a conical shape.

Referring now to FIGURE 2, there is shown a representative monitoring circuit 36 which may be used in the FIGURE 1 system. As shown therein, thermopile 34 comprises two hot thermocouple junctions 54 and 56. Thus a conductor 58 of a first metal is connected to conductors 60 and 62 of a second metal, forming junctions 54 and 56 respectively. A cold thermocouple junction 64 is formed by the connection of a conductor 66 of the first metal to conductor 68 of the second metal, with conductor 66 being connected to conductor 58. Conductors 58, 60 and 62 are preferably of very small gauge, so as to have appreciable electrical resistance. Conductors 60 and 62 are connected to the opposite ends of a center tapped secondary winding 70 of a transformer 72. A suitable monitoring device or load 74 (illustrated as a meter) is connected between conductor 68 and center tap 76 of winding 70. Conductors 37 (see FIGURE 1) are connected on opposite sides of load 74.

In the circuit thus constructed, alternating current from winding 70 is fed through junctions 54 and 56 in series, thus heating these junctions to some temperature above ambient. Load 74 and cold junction 64 are isolated from the alternating current due to the symmetrical connection to the electrical midpoint of winding 70 and to conductor 58, thus junction 64 is not heated by alternating current from winding 70. Direct current voltage is developed between conductor 68 and center tap 76, which direct current voltage depends upon the temperature of hot junctions 54 and 56 above the temperature of cold junction 64.

Referring now to FIGURE 1, as previously noted, hot junctions 54 and 56 are positioned in passage 32 to be cooled by air currents therein. It has been found that sensitivity may be improved by positioning webs 78 and 80 in passage 32, the webs being provided with apertures 82 and 84 directly aligned with and closely adjacent hot junctions 54 and 56 to concentrate airflow in passage 32 on the hot junctions.

When a strand 24 of a given control denier is run through orifice 26 at a give velocity, a particular airflow condition is set up in tube 32 with a resulting given degree of cooling of hot junctions 54 and 56. Any variation in denier of strand 24 will cause a corresponding change in airflow in tube 32. Since the temperature of junctions 54 and 56, and thus the output signal developed between conductors 68 and central tap 76, depends on airflow in tube 32, changes in denier are efficiently detected and transduced into an electrical output signal.

By way of example, a successful block was made wherein the orifice walls had a contour conforming to a segment of a toroid defined by rotating an ellipse with a major axis of two inches and a minor axis of $3\%_{64}$ inch about a line parallel to and $20\%_{64}$ inch from the major axis. This provided a diameter at the narrow portion 50 of $9\%_{64}$ inch and a diameter at the broad portion at 48 of $40\%_{64}$ inch. When a strand of approximately 2100 denier yarn was run through the orifice at 500 yards per minute, denier variations of about 3 percent were readily detected.

The output signal on conductors 37 may be used to control the speed of take-up device 30 instead of controlling the spinneret temperature or the speed of pump motor 44. If desired, the signal on conductors 37 may be used to operate a sensitive relay and acuate a suitable alarm, or may be used to shut down the process being monitored if the denier varies a predetermined amount from a control denier, instead of or in addition to controlling the denier.

While the denier monitoring system has been illustrated as controlling a spinning process, the denier monitoring apparatus according to the present invention is useable for monitoring other processes, such as filament drawing.

Accordingly, it will be seen from the above disclosure and the accompanying drawings that the denier monitoring apparatus according to the present invention has been greatly simplified with respect to previous practices in the art, while retaining excellent sensitivity and reliability. In particular, the elimination of external pneumatic pressure or vacuum sources and lines greatly reduces the cost of the apparatus as well as eliminating the numerous problems associated with such pneumatic or vacuum apparatus. The smooth and continuous decrease in orifice contour from the enterirng portion to a further restricted portion utilizes the movement of the strand itself to provide the necessary air movement for actuating the thermopile, which is the preferred flow measurement apparatus.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Denier monitoring apparatus comprising in combination:
    (a) means defining an axially elongated monitoring orifice having an entrance portion and a further portion,
    (b) strand handling means feeding a strand axially through said orirfice from said entrance portion to said further portion,
    (c) means defining an air passage having one end communicating with said further portion and having another end communicating with the atmosphere,
    (d) airflow detection means positioned within said air passage,
    (e) the cross-sectional area of said orifice continuously decreasing from a larger area at said entrance portion to a reduced area at said further portion.

2. Denier monitoring apparatus comprising in combination:
    (a) means defining an axially elongated monitoring orifice having an entrance portion and a further portion,
    (b) strand handling means feeding a strand axially through said orifice from said entrance portion to said further portion,
    (c) means defining an air passage having one end communicating with said further portion and having another end communicating with the atmosphere,
    (d) airflow detection means positioned within said air passage,
    (e) the cross-sectional area of said orifice continuously decreasing as an inverse exponential function of the axial distance from said entrance portion toward said further portion.

3. Denier monitoring apparatus comprising in combination:
    (a) means defining an axially elongated monitoring orifice having an entrance portion and a further portion,
    (b) strand handling means feeding a strand axially through said orifice from said entrance portion to said further portion,
    (c) means defining an air passage having one end communicating with said further portion and having another end communicating with the atmosphere,
    (d) airflow detection means positioned within said air passage,
    (e) the cross-sectional area of said orifice continuously decreasing linearly as a function of axial distance from said entrance portion toward said further portion.

4. Denier monitoring apparatus comprising in combination:
    (a) means defining an axially elongated monitoring orifice having an entrance portion and a further portion,
    (b) strand handling means feeding a strand axially through said orifice from said entrance portion to said further portion,
    (c) means defining an air passage having one end communicating with said further portion and having another end communicating with the atmosphere,
    (d) airflow detection means positioned within said air passage,
    (e) the cross-sectional area of said orifice continuously decreasing as an elliptical function of the distance from said entrance portion toward said further portion.

5. Denier monitoring apparatus comprising in combination:
   (a) means defining an axially elongated monitoring orifice having an entrance portion and a further portion,
   (b) strand handling means feeding a strand axially through said orifice from said entrance portion to said further portion,
   (c) means defining an air passage having one end communicating with said further portion and having another end communicating with the atmosphere,
   (d) airflow detection means positioned within said air passage,
   (e) the cross-sectional area of said orifice continuously decreasing from a larger area at said entrance portion to a reduced area at said further portion,
   (f) and control means, responsive to said airflow detection means, for maintaining the denier of said strand substantially constant.

6. Denier monitoring apparatus comprising in combination:
   (a) means defining an axially elongated monitoring orifice having an entrance portion and a further portion,
   (b) strand handling means feeding a strand axially through said orifice from said entrance portion to said further portion,
   (c) means defining an air passage having one end communicating with said further portion and having another end communicating with the atmosphere,
   (d) airflow detection means positioned within said air passage,
   (e) the cross-sectional area of said orifice continuously decreasing from a larger area at said entrance portion to a reduced area at said further portion,
   (f) and control means responsive to said airflow detection means, for indicating the denier of said strand.

7. Denier monitoring apparatus comprising in combination:
   (a) means defining an axially elongated monitoring orifice having an entrance portion and a further portion,
   (b) strand handling means feeding a strand axially through said orifice from said entrance portion to said further portion,
   (c) means defining an air passage having one end communicating with said further portion and having another end communicating with the atmosphere,
   (d) airflow detection means positioned within said air passage, said airflow detection means comprising a heated thermopile within said passage,
   (e) the cross-sectional area of said orifice continuously decreasing from a larger area at said entrance portion to a reduced area at said further portion,
   (f) and control means responsive to said airflow detection means, for indicating the denier of said strand.

References Cited in the file of this patent

UNITED STATES PATENTS

| | | |
|---|---|---|
| 2,014,998 | Baguley et al. | Sept. 17, 1935 |
| 2,516,932 | Wainwright | Aug. 1, 1950 |
| 2,682,144 | Hare | June 29, 1954 |